(12) United States Patent
Heinemann et al.

(10) Patent No.: US 8,964,274 B2
(45) Date of Patent: Feb. 24, 2015

(54) SYSTEM AND METHOD FOR DIRECT IMAGING

(71) Applicants: Orbotech Ltd., Yavne (IL); Laser Imaging Systems GmbH & Co. KG, Jena (DE)

(72) Inventors: Stefan Heinemann, Jena (DE); Wolfgang Retschke, Jena (DE); Holger Wagner, Jena (DE); Jonas Burghoff, Apolda (DE); Abraham Gross, Ramat Aviv (IL)

(73) Assignees: Orbotech Ltd., Yavne (IL); Laser Imaging Systems GmbH & Co. KG, Jena (DE)

( * ) Notice: Subject to any disclaimer, the term of this patent is extended or adjusted under 35 U.S.C. 154(b) by 0 days.

(21) Appl. No.: 13/956,797

(22) Filed: Aug. 1, 2013

(65) Prior Publication Data

US 2013/0321898 A1 Dec. 5, 2013

Related U.S. Application Data

(63) Continuation of application No. 13/213,360, filed on Aug. 19, 2011, now Pat. No. 8,531,751.

(51) Int. Cl.
*G02B 26/08* (2006.01)
*G02F 1/11* (2006.01)
*H04N 1/04* (2006.01)

(52) U.S. Cl.
CPC ... *G02F 1/11* (2013.01); *H04N 1/04* (2013.01)
USPC .................................................. 359/204.3

(58) Field of Classification Search
CPC .............. G02B 26/08; G02B 26/0808; G02B 26/0816; G02B 26/0833; G02B 26/0841; G02B 26/12; G02B 26/121
USPC ................. 359/204.1–204.5, 216.1
See application file for complete search history.

(56) References Cited

U.S. PATENT DOCUMENTS

| 5,196,949 A | 3/1993 | Swanberg | |
|---|---|---|---|
| 5,808,657 A * | 9/1998 | Kurtz et al. | 347/239 |

(Continued)

FOREIGN PATENT DOCUMENTS

| DE | 19751106 A1 | 5/1998 |
|---|---|---|
| EP | 0992350 A1 | 4/2000 |
| EP | 1235102 A2 | 8/2002 |

OTHER PUBLICATIONS

Extended European Search Report for European Application EP12179630 dated Jul. 25, 2013.

*Primary Examiner* — Euncha Cherry
(74) *Attorney, Agent, or Firm* — Sughrue Mion, PLLC

(57) ABSTRACT

A direct imaging system comprises an illumination unit comprising a plurality of light sources, the plurality of light sources configured to emit a plurality of beams, an optical system for forming the plurality of beams to be aligned in position or angle, an acoustic optical modulator positioned to receive the plurality of beams aligned in one of position or angle and to consecutively diffract different portions of the plurality of beams as an acoustic wave propagates in an acoustic direction, and a scanning element adapted to scan an exposure plane with the plurality of beams modulated by the acoustic optical modulator at a scanning velocity, wherein the scanning velocity is selected to incoherently unite the different portions of the plurality of beams into a single exposure spot.

3 Claims, 16 Drawing Sheets

(56) References Cited

U.S. PATENT DOCUMENTS

| | | |
|---|---|---|
| 5,923,475 A | 7/1999 | Kurtz et al. |
| 6,072,518 A | 6/2000 | Gelbart |
| 6,295,079 B1 * | 9/2001 | Saito .............................. 347/255 |
| RE38,297 E | 11/2003 | Montgomery |
| 2002/0117067 A1 | 8/2002 | Fischer et al. |

* cited by examiner

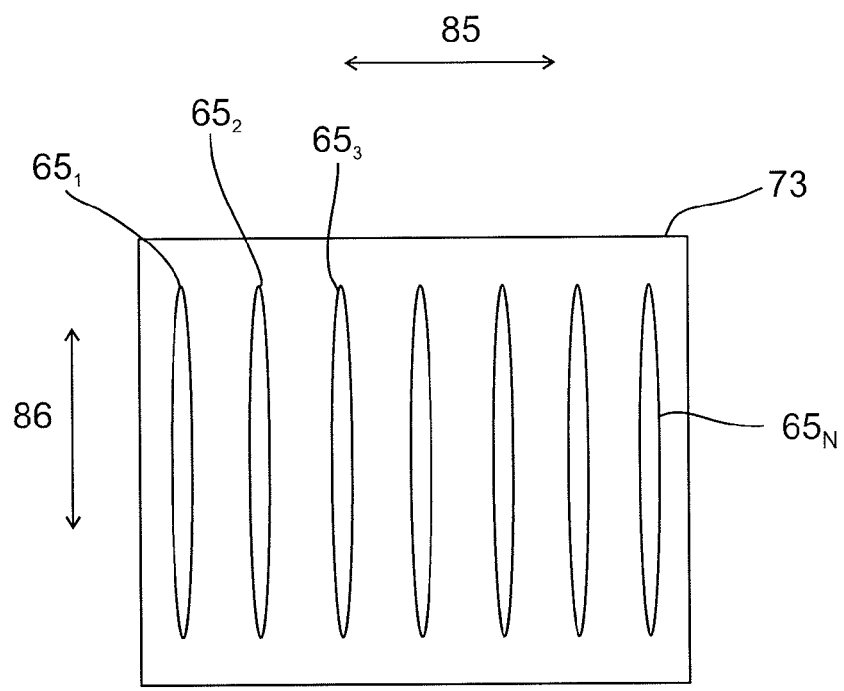
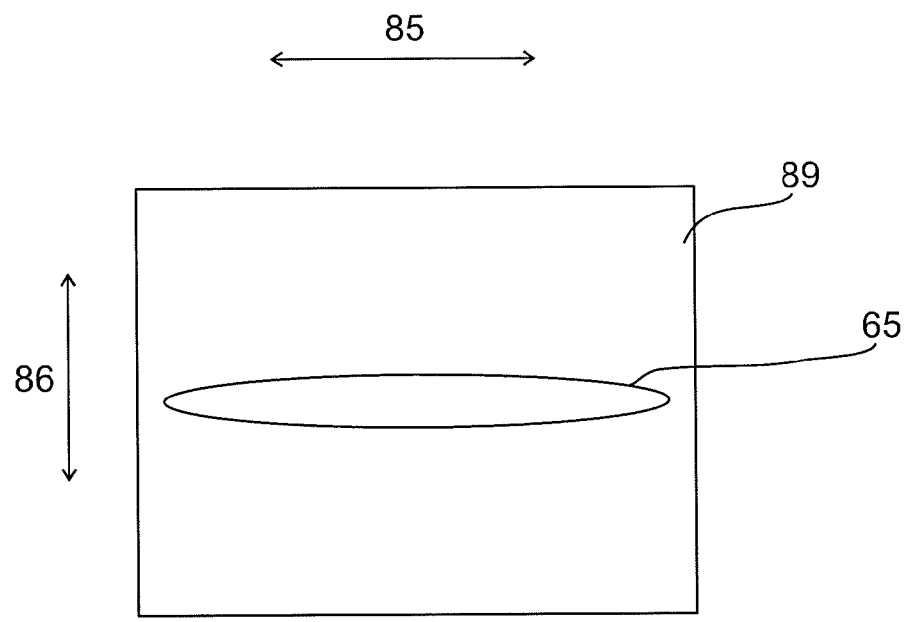
FIG. 3C

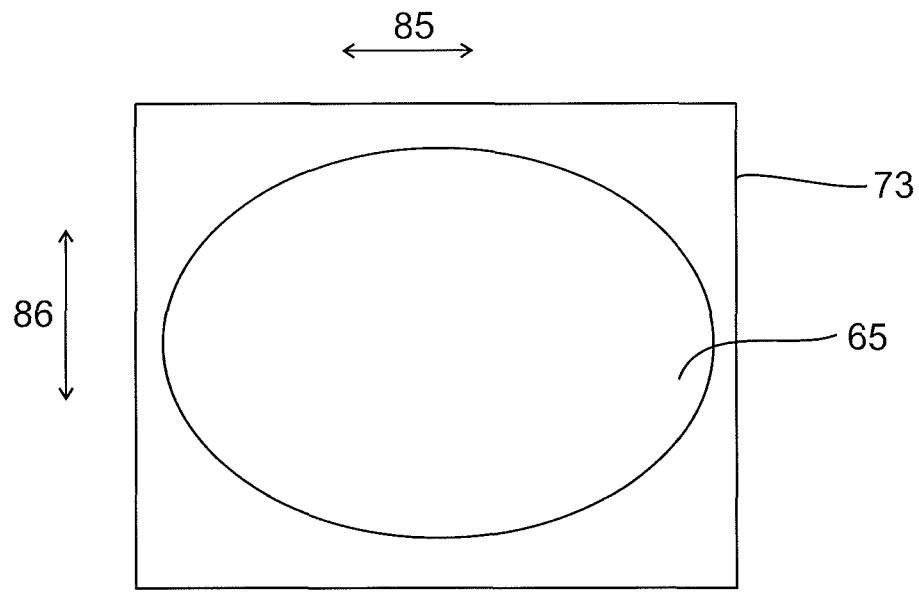
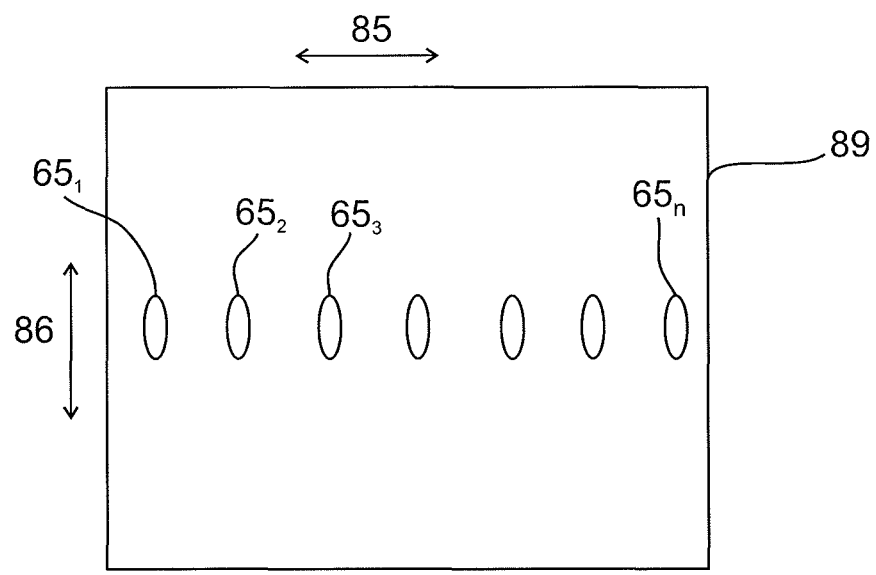
FIG. 4C

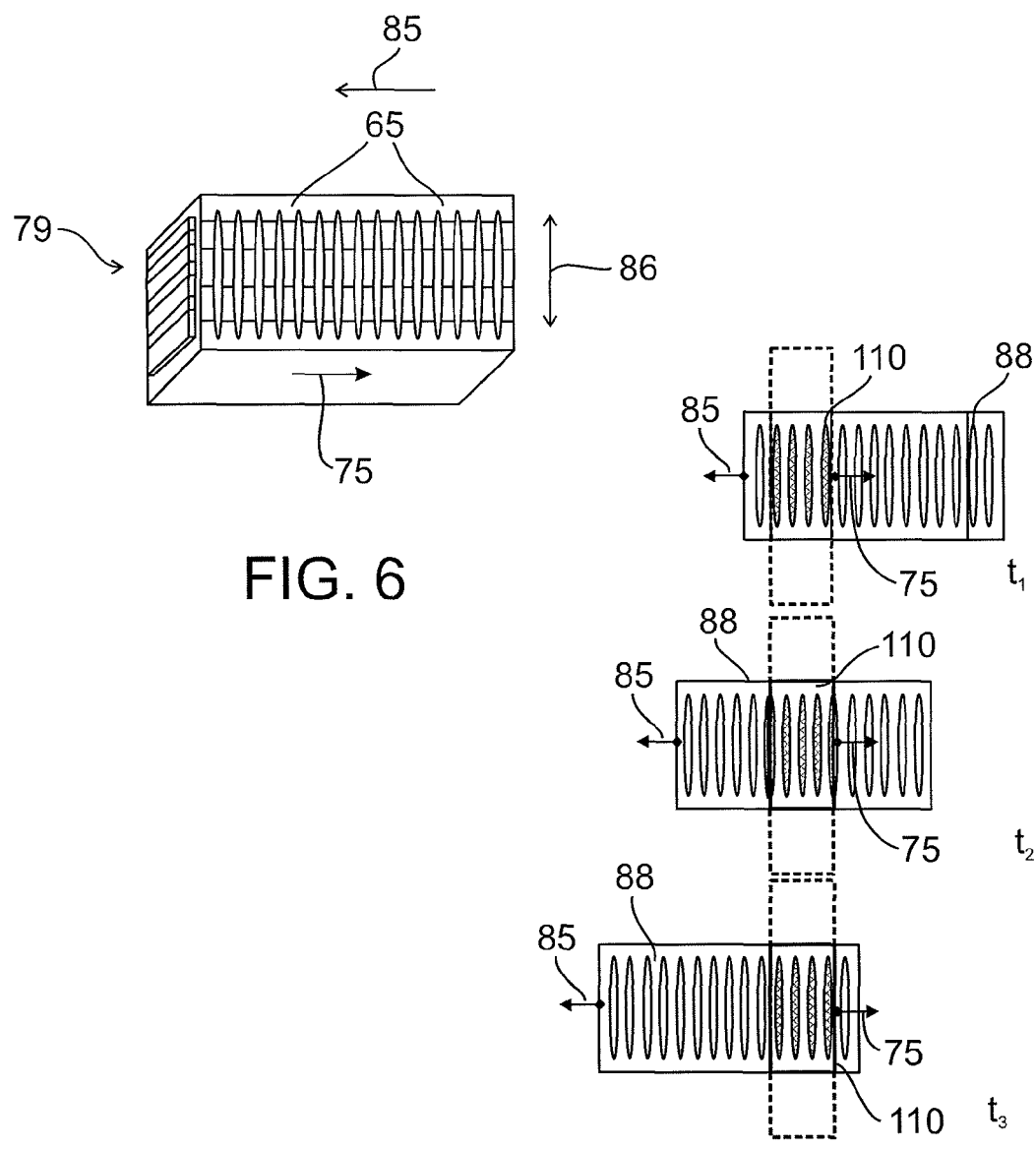
FIG. 6
FIG. 7
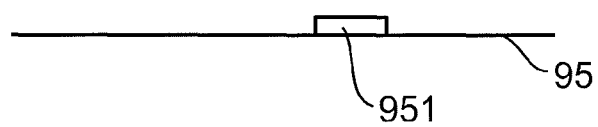

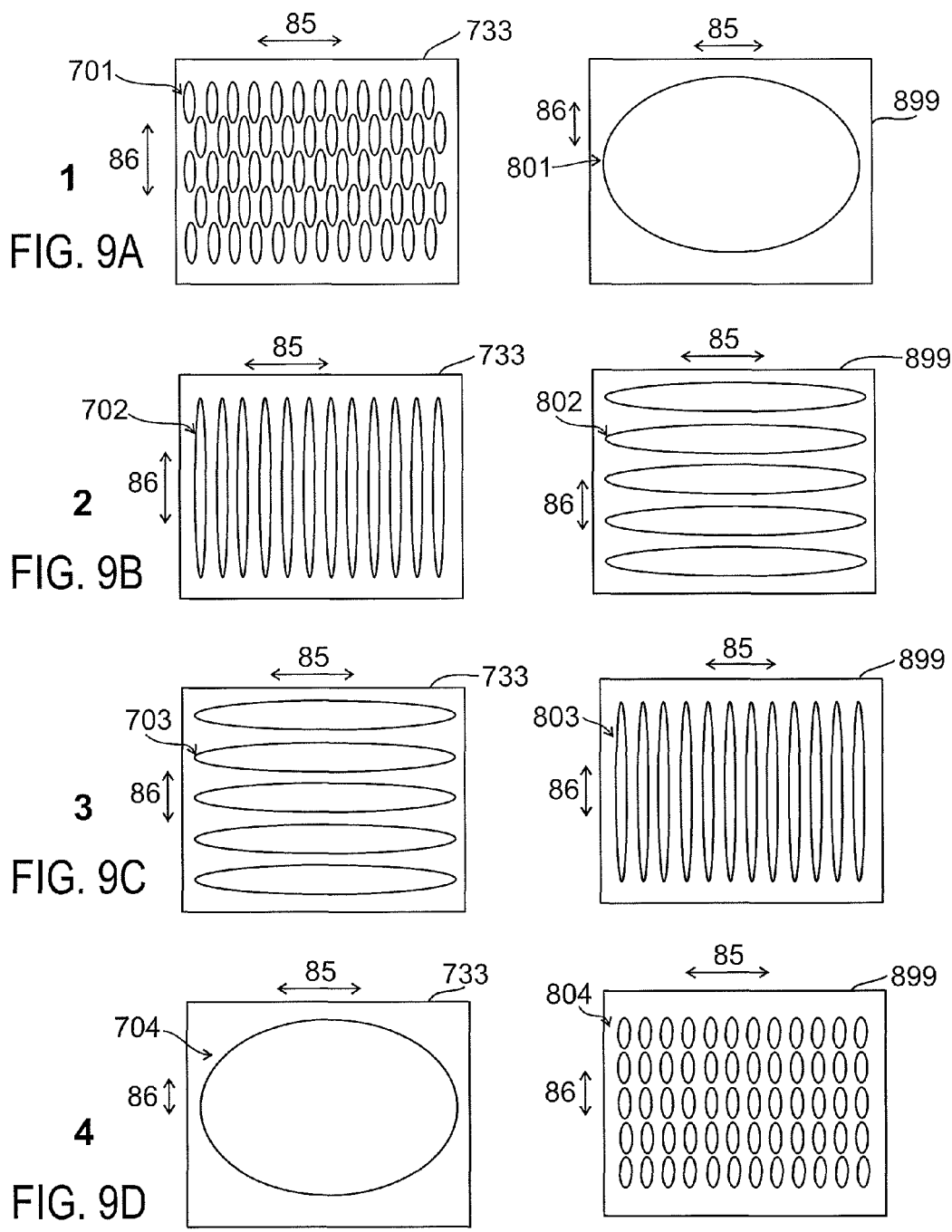

SYSTEM AND METHOD FOR DIRECT IMAGING

CROSS REFERENCE TO RELATED APPLICATIONS

This application is a continuation of U.S. application Ser. No. 13/213,360 filed Aug. 9, 2011, the disclosure of which is incorporated in its entirety.

FIELD OF THE INVENTION

The present invention, in some embodiments thereof, relates to Direct Imaging (DI) using acoustic modulation and, more particularly, but not exclusively, to direct imaging with semiconductor Laser Diodes (LDs).

BACKGROUND OF THE INVENTION

In Direct Imaging (DI) systems, a scanning beam is used to directly write an image, one or more pixels at a time onto an exposure surface such as a photoresist. The image is sometimes obtained by modulating the scanning beam with an Acoustic Optical Modulator (AOM) also called a Bragg cell. The AOM uses the acousto-optic effect to diffract and deflect light using sound waves (usually at radio-frequency) based on stored image data. Once modulated, scanning is typically provided in a raster pattern by reflecting the modulated beam off a multi-faceted rotating polygon as the exposure surface (or scanning beam) advances in a scan direction.

In some known systems, the Scophony scanning effect is used to minimize spatial blurring of a generated pattern caused by: a) a finite velocity of the acoustic wave in the modulator and b) a continuous nature of the laser illuminator. A requirement for the Scophony scanning effect is that the acoustic velocity of the sound wave in the AOM, increased by a magnification ratio of the optical system between the AOM and exposure surface, is equal to the scan speed of a writing spot on the exposure surface, but in the opposite direction. The Scophony scanning effect leads to "standing" data information on a predetermined place on the exposure surface.

U.S. Pat. No. 4,205,348 entitled "Laser scanning utilizing facet tracking and acousto pulse imaging techniques," the contents of which is incorporated herein by reference, describes a method and apparatus for improving the efficiency and resolution of laser scanning systems using a multifaceted rotating polygon as the scanner device. An acousto-optic Bragg cell is utilized as an active optical element to both modulate and deflect an incident laser beam so that the modulated beam is caused to track one facet of the scanner during a complete scan and to shift to the adjacent facet for the following scan. In order to provide facet tracking the acoustic carrier frequency must vary in time synchronization with the scanning action of the surface of the recording medium. It is described that imaging of the input electrical signal on the recording medium surface is accomplished without blurring, using the Scophony scanning effect by moving the image of the acoustic pulses at the surface of a recording medium at the same relative velocity, in the opposite direction, as the velocity of the laser recording, or write beam.

U.S. Pat. No. 5,309,178 entitled "Laser marking apparatus including an acoustic modulator," the contents of which is incorporated herein by reference, describes a laser marking apparatus includes at least one laser beam source, a multichannel acoustic modulator defining a plurality of at least partially overlapping modulation regions, apparatus for directing at least one laser beam from the at least one laser beam source through the multichannel acoustic modulator such that each laser beam extends across at least two of the at least partially overlapping modulation regions, and imaging apparatus for directing light from the modulator to a laser marking image plane.

The laser beam source is operated in continuous wave mode. It is described that a Laser Diode (LD) is used as the laser beam source for scanning a recording medium with a material of high photosensitivity. Optionally, a pair of LDs, each with a corresponding driver, a retardation plate and a collimation lens is as the laser beam source. When employing the pair of LDs, the retardation plates rotate the polarization vectors of the LDs so that they can be combined without loss of energy by a polarizer beam splitter.

U.S. Pat. No. 6,770,866 entitled "Direct pattern writer," the contents of which is incorporated herein by reference, describes an apparatus for scanning a beam across a surface including a scanner scanning a pulsed laser beam across a surface and a position indicator receiving an input from the pulsed laser beam at a plurality of locations across the surface, and outputting position indications indicating a position of said pulsed laser beam along said surface. The position indications are used to modulate data in apparatus for exposing patterns on surfaces, for example electrical circuit patterns on photosensitized surfaces. One use of such apparatus is the manufacture of electrical circuits. It is described that edge fixing is accomplished by employing the Scophony scanning effect.

U.S. Pat. No. 7,046,266 entitled "Scanner System," the contents of which is incorporated herein by reference, describes a method of scanning for writing a pattern on a surface. The method includes providing a scanning beam comprised of a plurality of independently addressable sub-beams, an unmodulated energy of said scanning beam having a generally Gaussian profile; scanning the surface with said scanning beam a plurality of times, said sub-beams scanning the surface side-by side in the cross-scan direction, each said sub-beam being modulated to reflect information to be written; and overlapping the beams in successive scans in the cross-scan direction such that all written areas of the surface are written on during at least two scans. Modulation is provided by an acosto-optic modulator (Bragg cell). The Scophony effect is used to decrease or remove blur of generated edges in the scan direction of flying spot scanners.

There is also described a scanning apparatus with a beam comprising energy at two distinct spectral lines, modulated by data; and an optical system that receives the beam and focuses it on the surface, such that a pattern is written on the surface by the at least one beam and such that the energy at both spectral lines is focused on the surface at the same position. Focusing at the same position is provided by designing the entrance and exist faces of the AOM such that the difference in refraction for the two beams (at the different wavelengths) at the input and output faces is exactly equal and opposite to the difference in Bragg angles for the beams. Thus, the two beams which enter together, exit together.

U.S. Patent Publication No. 2007/0058149, entitled "Lighting System and Exposure Apparatus," the contents of which is incorporated herein by reference, describes a method and apparatus for illuminating a recording medium with two dimensional array of semiconductor LDs. The two dimensional array of LDs are used to replace lower efficiency mercury lamps or excimer lasers. Diffused beams output from the two-dimensional array of LDs are converted into high-directivity beams with spread angles equalized circumferentially by two kinds of cylindrical lenses. Tilt in optical axis of individual beams due to misalignment with the center of the beam is corrected by a two dimensional array wedged glass. The beams are modulated with a two-dimensional light modulator such as a mask or a Digital Minor Device (DMD) for maskless exposure.

SUMMARY OF THE INVENTION

According to an aspect of some embodiments of the present invention there is provided a system and method for Direct Imaging (DI) with one or more arrays of light sources modulated with an Acoustic Optical Modulator (AOM). According to some embodiments of the present invention, the system and method for DI combines beams from the one or more arrays of light sources incoherently toward a single exposure spot using the Scophony principle. Optionally, the one or more arrays of beam sources are an array of low power beam sources, e.g. LDs. Optionally, beams from different arrays are combined for scaling power of the beams. Optionally, the array of light sources is an array of light sources including multiple wavelengths.

According to an aspect of some embodiments of the present invention there is provided a direct imaging system comprising an illumination unit comprising a plurality of light sources, the plurality of light sources configured to emit a plurality of beams, an optical system for forming the plurality of beams to be aligned in position or angle, an acoustic optical modulator positioned to receive the plurality of beams aligned in one of position or angle and to consecutively diffract different portions of the plurality of beams as an acoustic wave propagates in an acoustic direction, and a scanning element adapted to scan an exposure plane with the plurality of beams modulated by the acoustic optical modulator at a scanning velocity, wherein the scanning velocity is selected to incoherently unite the different portions of the plurality of beams into a single exposure spot.

Optionally, the plurality of light sources is plurality of semiconductor laser diodes.

Optionally, at least one light source of the plurality of light sources is adapted to emit light at a different wavelength than at least one other light source of the plurality of light sources.

Optionally, the plurality of light sources emits light at a range between 370-410 nm.

Optionally, at least one light source of the plurality of light sources is adapted to have a polarization that is different than at least one other at least one light source of the plurality of light sources.

Optionally, the plurality of light sources is arranged in one or more arrays, wherein each array aligned with a scan direction of the direct imaging system.

Optionally, each of the arrays includes 2-100 light sources.

Optionally, only a portion of the light sources are operated at a time.

Optionally, the scanning element is a rotating polygon including a plurality of facets, and wherein portion of the light sources that are operated are selected responsive to an angle of one of the plurality of facets during scanning.

Optionally, each light source in the plurality of light sources is associated with a dedicated lens, wherein the dedicated lens is adapted to shape a beam emitted from a light source.

Optionally, the dedicated lens is adapted to shape the beam to be elongated in a direction perpendicular to the scan direction.

Optionally, the dedicated lens is adapted to shape the beam to be elongated in a direction perpendicular to the cross-scan direction.

Optionally, the acoustic optical modulator is associated with an aperture for receiving the plurality of beams and wherein the dedicated lens and the optical system is adapted to shape the beam to fill the aperture in at least one of a direction perpendicular to a scan direction and a direction perpendicular to a cross-scan direction.

Optionally, the optical system includes an element adapted to collimate beams from the plurality of light sources directed toward the acoustic optical modulator.

Optionally, the optical system includes a telecentric optical system adapted to direct the plurality of beams to an aperture of the acoustic optical modulator.

Optionally, each of the different portions of the plurality of beams includes a portion from each of the plurality of beams received from the acoustic optical modulator.

Optionally, each of the different portions of the plurality of beams includes one or more beams from the plurality of beams.

Optionally, the scanning velocity is defined to match an acoustic velocity of acoustic optical modulator times a magnification ratio of the system but in an opposite direction.

Optionally, the acoustic optical modulator is a multi-channel acoustic optical modulator.

Optionally, the system addition comprises at least two of the illumination unit and at least one optical element for combining corresponding beams from the at least two of the illumination unit.

Optionally, corresponding beams from the more than one illumination unit differ in at least one of wavelength and polarization.

According to an aspect of some embodiments of the present invention there is provided a method for direct imaging, the method comprising providing an illumination unit including a plurality of light sources adapted to emit a plurality of beams, directing the plurality of beams toward an acoustic optical modulator so that the plurality of beams are aligned one of position or angle, consecutively diffracting different portions of the plurality of beams while an acoustic wave propagates in an acoustic direction, and scanning an exposure plane in a scan direction with output from the acoustic optical modulator, wherein the scanning is performed at a scanning velocity, and wherein the scanning velocity is selected to incoherently unite the different portions of the plurality of beams into a single exposure spot.

Optionally, the plurality of light sources includes is a plurality of semiconductor laser diodes.

Optionally, at least one light source of the plurality of light sources is adapted to emit light at a different wavelength than at least one other light source in the plurality of light sources.

Optionally, the array of light sources emits light at a range between 370-410 nm.

Optionally, at least one light source of the plurality of light sources is adapted to have a polarization that is different than at least one other light source in the plurality of light sources.

Optionally, the plurality of light sources is arranged in one or more arrays, wherein each array aligned with a direction of the scanning.

Optionally, each of the arrays includes 2-100 light sources.

Optionally, the method further comprises operating only a portion of the light sources at a time.

Optionally, the portion of the light sources that are operated are selected responsive to an angle of a facet used for the scanning.

Optionally, the method further comprises shaping each of the plurality of beams to be elongated in a direction perpendicular to a scan direction of the scanning.

Optionally, the method further comprises shaping each of the plurality of beams to be elongated in a direction perpendicular to a cross-scan direction of the scanning.

Optionally, the method further comprises shaping each of the plurality of beams to fill an aperture of the acoustic optical modulator in at least one of a direction perpendicular to a scan direction of the scanning and a direction perpendicular to a cross-scan direction of the scanning.

Optionally, each of the different portions of the plurality of beams includes a portion from each of the plurality of beams received from the acoustic optical modulator.

Optionally, each of the different portions of the plurality of beams includes one or more beams from the plurality of beams.

Optionally, the method further comprises collimating beams from the plurality of light sources directed toward the acoustic optical modulator.

Optionally, the method further comprises matching an acoustic velocity of acoustic optical modulator times a magnification ratio of the system but in an opposite direction.

Optionally, the method further comprises providing a plurality of illumination units and combining corresponding beams from the plurality of illumination units.

Optionally, the corresponding beams from the more plurality of illumination units differ in at least one of wavelength and polarization.

According to an aspect of some embodiments of the present invention there is provided a method for facet tracking in a direct imaging system, the method comprising providing an array of light sources adapted to emit an array of beams, wherein the array of light sources is aligned with a scan direction of the direct imaging system, directing the beams from the array of lights sources toward an acoustic optical modulator so that the plurality of light sources project light along a length greater than length of a single facet of a rotating polygon used for scanning, scanning an exposure plane in the scan direction with output from the acoustic optical modulator, and selectively operating different subsets of the lights sources in coordination with rotation of the polygon, wherein the subsets of the light sources selected are light sources that impinge on a facet used for scanning.

Optionally, the method further comprises adjusting each light source of array to have a different angle of incidence in acoustic optical modulator so that the plurality of beams operated impinge along a length of the facet used for scanning.

Optionally, the method further comprises turning off light sources from the plurality of light sources that emit beams that impinge near or past an edge of the facet used for scanning in coordination with rotation of the polygon.

Optionally, the method further comprises incoherently uniting the plurality of beams operated into a single exposure spot.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3C showing a simplified schematic diagram of beams imaged on an AOM and a pupil plane in accordance with some embodiments of the present invention;

FIG. 4C showing a simplified schematic diagram of beams imaged on an AOM and a pupil plane in an alternate exemplary optical design in accordance with some embodiments of the present invention;

FIG. 6 is a schematic diagram showing an exemplary array of light beams arranged in a multi-channel AOM in accordance with some embodiments of the present invention;

FIG. 7 is an exemplary schematic illustration of light beam modulation using the Scophony scanning effect over three different time frames in accordance with some embodiments of the present invention;

FIGS. 9A, 9B, 9C and 9D are exemplary schematic diagrams of a matrix of beams arranged in a plurality of arrays as imaged on AOM planes and corresponding pupil planes in accordance with some embodiments of the present invention;

DESCRIPTION OF SPECIFIC EMBODIMENTS OF THE INVENTION

Figure 1:
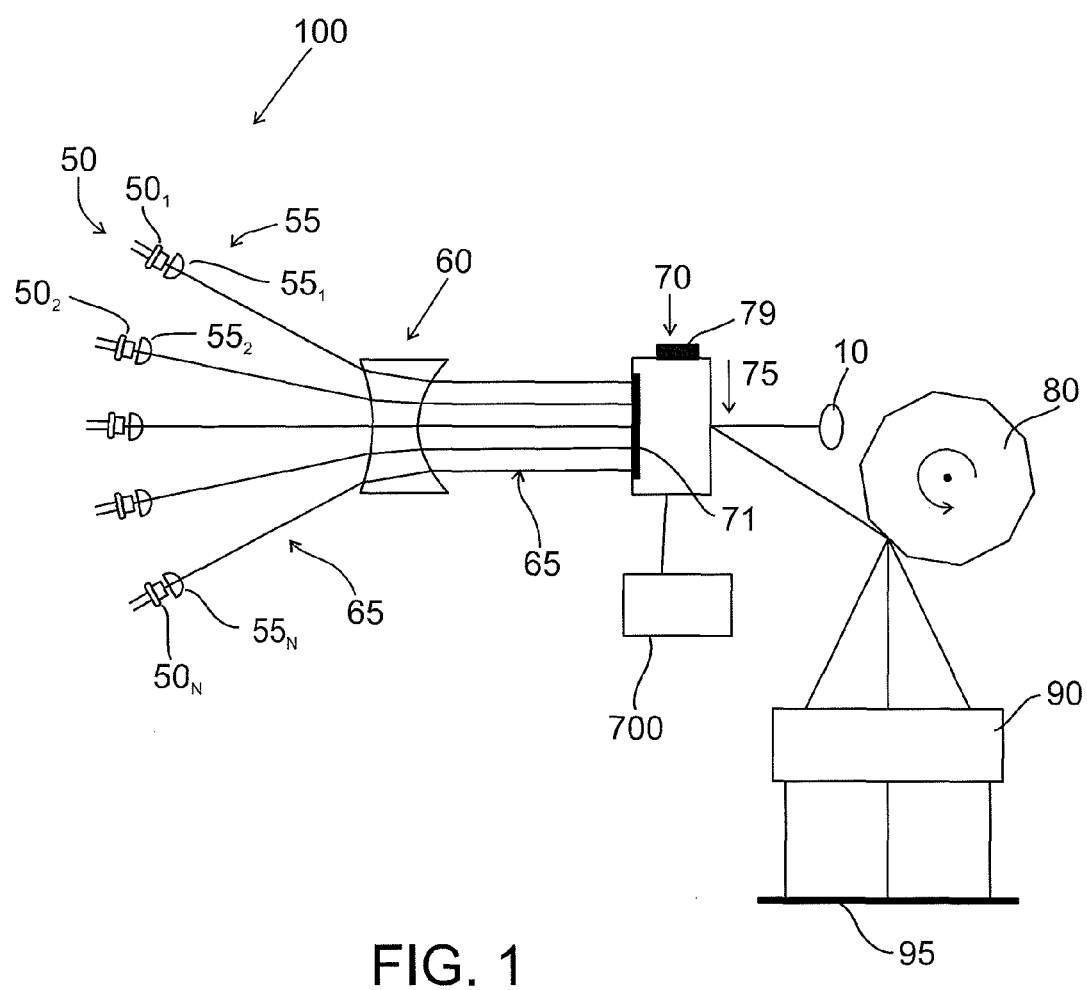
FIG. 1 is a simplified block diagram of an exemplary DI scanning system in accordance with some embodiments of the present invention.

The present invention, in some embodiments thereof, relates to DI using acoustic modulation and, more particularly, but not exclusively, to direct imaging with semiconductor LDs.

According to some embodiments of the present invention there is provided a DI system that uses one or more arrays of light sources modulated by an AOM to form a writing beam for scanning a recording medium. In some exemplary embodiments, the array of light sources is a dense array, e.g. including 50 light sources or 2-100 light sources, that is shaped to form the writing beam. In some exemplary embodiments, a plurality of arrays and/or matrix of light sources including 50×10 light sources is used to form a writing beam. Optionally, the array includes light sources with different spectral properties, for example, light sources with different wavelengths, e.g. ranging between 370-410 nm and/or different polarizations. Typically, the light sources in the array are operated in continuous wave mode. In some exemplary embodiments, the array is an array of semiconductor LDs.

Typically, the system includes a scanning optical system for imaging the plane of the AOM onto a recording medium, e.g. panel to be exposed at a desired magnification. According to some embodiments of the present invention, the scanning optical system is achromatic over the wavelength range of the array of light sources. Typically, a polygon mirror deflects the beam to provide raster scanning.

According to some embodiments of the present invention, a DI method provides for repeatedly exposing spots on the recording medium with different light sources in the array(s) during a single scanning sweep of the DI system. According to some embodiments of the present invention, the repetitive exposure over a single sweep is provided by applying the Scophony scanning effect.

According to some embodiments of the present invention, the light sources in each of the one or more arrays are arranged laterally in the AOM along the acoustic direction so that as the acoustic wave propagates, the wave consecutively switches individual beams in each of the one or more arrays. In some exemplary embodiments, the beams are shaped to span an acoustic direction of the AOM so that as the acoustic wave propagates, the acoustic wave consecutively switches portions of all the beams in the one or more arrays. According to some embodiments of the present invention, the Scophony scanning effect is used to coordinate the velocity of the acoustic wave and the magnification provided by a scanning optical system with the scanning velocity so that each of the switched beams in the array impinge the recording medium in a same spot.

In some exemplary embodiments, the AOM is a multi-channel AOM, e.g. a 24 channel AOM or 4-1000 channel AOM and multiple pixels (or spots) are written simultaneously during scanning, each of which can be repetitively exposed over a single sweep by applying the Scophony scanning effect as described herein. In some exemplary embodiments, beams from individual light sources in the one or more arrays are shaped to be elongated in the cross-scan direction and the channels of the multi-channel AOM are arranged along the cross-scan directions so that each channel modulates a different portion of each elongated beams. In other exemplary embodiments, each of the beams from individual light sources in the array is shaped to fill an entire area of an aperture of the AOM.

The present inventors have found that repetitive exposure with a plurality of semiconductor LDs using the Scophony scanning effect as described herein may provide a plurality of advantages. Optionally, some of the advantages are associated with reducing a bill of material of a DI system by replacing the laser units typically used for DI with a lower cost array of light sources, e.g. semiconductor LDs, each of which operate at a lower power, e.g. 5-50 W laser light source or 0.1-2 W semiconductor LD. Specifically, semiconductor LDs as compared to pulsed solid-state lasers of previous systems are lower in cost, are relatively service free and have a relatively longer lifetime. In some exemplary embodiments, repeated exposure with low power light sources using the DI system and method described herein provides for scanning material of low photosensitivity. The present inventors have found that, repeated exposure of a same spot with a plurality of lower power LDs provides the accumulated energy required to write on a material having low photosensitivity. In some exemplary embodiments, repeated exposure with a plurality of light sources allows for using light sources with higher tolerances typically associated with lower cost light sources since the resulting spatial profile and spectrum can be defined by the average properties of the light sources. The present inventors have also found that the repetitive exposure with a plurality of light sources provides a smoothing effect that improves the overall quality of the exposure. In some exemplary embodiments, the array of light sources includes one or more auxiliary light sources that can be operated when another light source in the array malfunctions. The present inventors have found that by including auxiliary light sources in the array, lower cost light sources typically associated with lower reliability can be used without compromising lifetime and/or reliability of the light source unit. Optionally, the redundancy provided by the auxiliary light sources allows the illumination unit to continue operating even if some light sources fail. Optionally, the plurality of light sources is combined to shape a desired spectrum. Another advantage of LDs is its relatively high wall-plug efficiency, e.g. as compared to known gas lasers and known Dioded-Pumped Solid State (DPSS) lasers.

According to some embodiments of the present invention, the DI system and methods described herein provide improved versatility over known DI systems. In some exemplary embodiments, the array of light sources includes light sources with different spectral characteristics. Optionally, the array includes light sources having different wavelengths. Typically, shorter wavelengths are used to provide rigidity on a surface of the recording medium while longer wavelengths are used to penetrate through the recording medium. In some exemplary embodiments, different wavelengths are used to expose a same spot on the exposure panel. Optionally, for a particular application and/or a particular sweep, specific light sources (and wavelengths required) in the array are selected and only those light sources are operated. Optionally, more than one array of light sources is used to scale the output power that the illumination unit can provide. Optionally, beams from light sources in the different arrays are combined to form a single beam.

According to some embodiments of the present invention, facet tracking is provided by using only a portion of the light sources to write each pixel or spot on an exposure surface and altering the portion of the light sources used in synchronization with an orientation of the active facet used for scanning. During facet tracking, each of the beams or at least a portion of the beams are formed to impinge the polygon at a different position.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 illustrates a simplified block diagram of an exemplary DI scanning system in accordance with some embodiments of the present invention. According to some embodiments of the present invention, an illumination unit 100 includes an array 50 of light sources $50_1, 50_2, \ldots 50_N$ providing a plurality of beams 65 that are shaped with a beam forming optical system 60 to fit into an aperture 71 of an AOM 70. Typically the light sources are LDs. According to some embodiments of the present invention, the plurality of beams 65 are arranged laterally along an acoustic direction of AOM 70 through aperture 71 and are collimated into a one dimensional array. Alternatively, each of the plurality of beams 65 has a large beam diameter, e.g. spanning the size of aperture 71 and the beams overlap in one position in the AOM. Typically, AOM 70 modulates incoming beams 65 based on image data received from a data control unit 700 and a scanning optical system 90 images the plane of the AOM including the modulated data onto exposure plane 95 as beams are deflected from rotating polygon 80.

According to some embodiments of the present invention, AOM 70 has an aperture 71, e.g. a large aperture that is optionally rectangular in shape and wide enough (along the acoustic direction 75) to receive the collimated array of beams 65. Optionally, aperture 71 has a width between 10-40 mm. In some exemplary embodiments, AOM 70 is a multi-channel AOM and aperture 71 is wide enough along a direction perpendicular to the acoustic direction 75 to span all channels in AOM 70. Optionally, AOM 70 includes between 24-48 channels. In some exemplary embodiments, AOM 70 is formed from an acousto-optical material that shows a low acoustic curvature factor. Optionally, AOM 70 is formed from a quartz crystal. Optionally AOM is formed from a $TeO_2$ crystal.

According to some embodiments of the present invention, array 50 is a one dimensional array of LDs. Optionally, the array is a dense array of light sources that are arranged in a crescent shape so that illumination from a large number of light sources can be directed toward beam forming optical system 60. In some exemplary embodiments, each LD in the array is associated with a dedicated lens $55_n$ (n=1, 2, ... N) from a lens array 55 that focuses and aligns beams 65 LDS 50 onto beam forming optical system 60. Typically, lens array 55 is included in illumination unit 100 and is housed in a common housing.

According to some embodiments of the present invention, array 50 includes LDs with different wavelengths, optionally ranging between 370-410 nm. Optionally, array 50 includes two or more LDs with a same wavelength. In some exemplary embodiments, array 50 includes LDs with a polarization oriented either parallel or perpendicular to the scan direction. In some exemplary embodiments, the LDs are operated in continuous mode. Typically, light source unit includes between 2 and 100 LDs, e.g. 50 LDs. In some exemplary embodiments, array 50 includes a certain amount of redundancy and only portion of the LDs in array 50 are operated at one time.

According to some embodiments of the present invention, beam forming optical system is used to shape the individual beams and to arrange the individual LDs beams inside aperture 71 of AOM 70. In some exemplary embodiments, beam forming optical system 60 includes single coupling optics for collimating beams in one plane along an acoustic direction 75 of the AOM 70.

In some exemplary embodiments, polygon 80 is similar to the polygon described in incorporated U.S. Pat. No. 6,770,866 and includes beam facet tracking capability for example as described in incorporated U.S. Pat. No. 4,205,348. Optionally facet tracking is achieved by operating only a subset of the array during each exposure and consecutively shifting the subset operated as the facet rotates as will be described in more detail herein below. In some exemplary embodiments, polygon 80 is rotated at a speed of between 1000-4000 RPM, e.g. 3000 RPM during operation. According to some embodiments of the present invention, the scanning optical system 90 is achromatic over the wavelength range of the LDs.

According to some embodiments of the present invention and as will be described in more detail herein below, as an acoustic wave propagates in acoustic direction 75, the wave consecutively switches each of beams 65 in turn by diffracting them toward polygon 80 for imaging onto exposure plane 95. Optionally, an acoustic wave diffracts more than one of beams 65 at a time as it propagates in acoustic direction 75. Typically, undiffracted beams are directed towards an optical stop 10. Alternatively, the opposite may be the case and the undiffracted light from AOM 70 may be imaged onto the recording medium while the diffracted light may encounter a stop.

Figure 2:
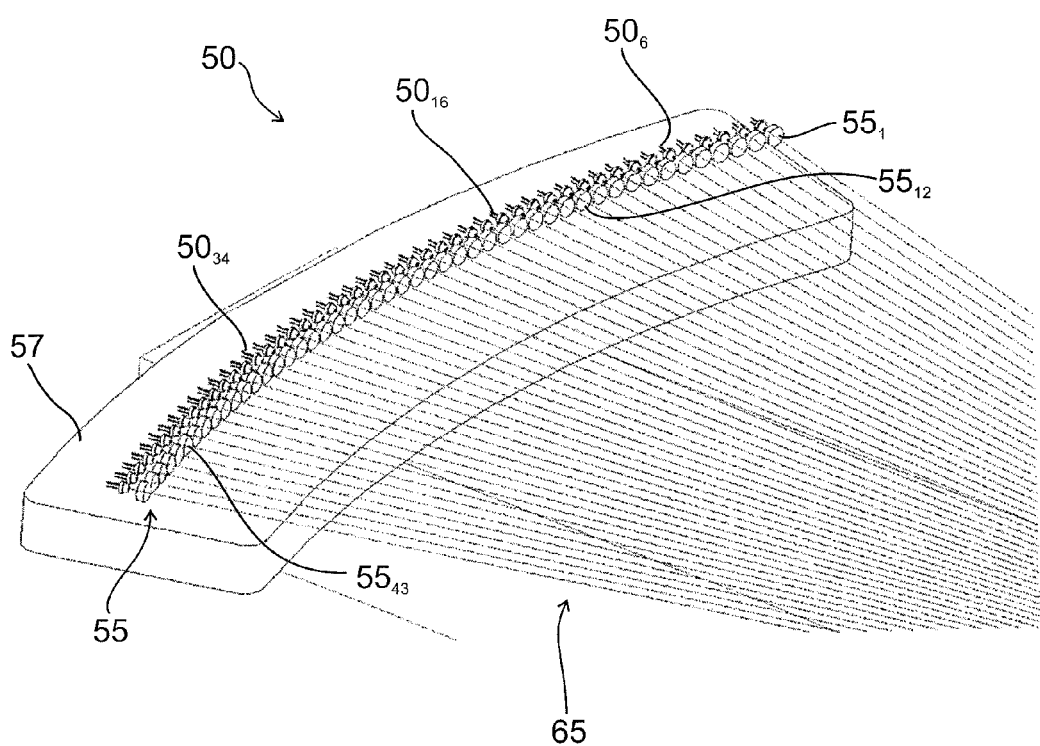
FIG. 2 is a simplified schematic drawing of an exemplary array of light sources in accordance with some embodiments of the present invention.

Reference is now made to FIG. 2 showing a simplified schematic drawing of an exemplary array of light sources in accordance with some embodiments of the present invention. According to some embodiments of the present invention, an illumination unit 100 includes a dense array of light sources $50_1, 50_2, \ldots 50_N$ mounted on a platform 57. Optionally, the array includes between 2 and 100 LDs, e.g. 50 LDs. Typically, illumination unit 100 includes a dedicated lens 55 for each LD mounted on platform 57 for focusing and aligning each of the beams. Optionally, the LDs are mounted in platform 57 in a crescent shape. Optionally, more than one array, e.g. two arrays of light sources is used.

Figure 3A:
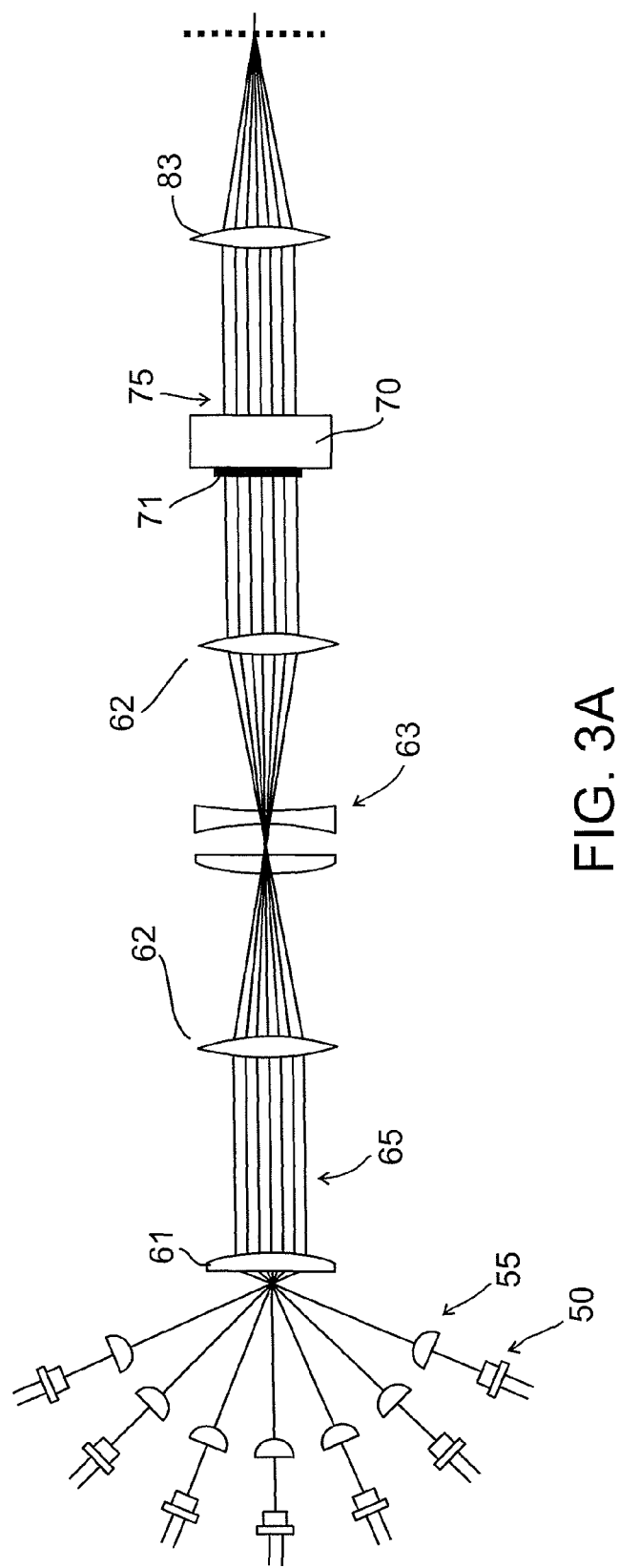
FIG. 3A is a schematic diagram of an exemplary optical design for arranging individual beams of the array inside an aperture of an AOM in accordance with some embodiments of the present invention.

Reference is now to FIG. 3A showing a schematic diagram of an exemplary optical design for arranging individual beams of the array inside an aperture of an AOM in accordance with some embodiments of the present invention. According to some embodiments of the present invention, the beam forming optical system includes a cylindrical lens 61 for collimating beams 65 from the individual LDs in the crescent shaped array 50 along an acoustic direction 75. Typically, the acoustic direction 75 is parallel to the scan direction. According to some embodiments of the present invention, the optical design additionally includes a telecentric telescope lens system 62 to relay beams along an acoustic direction 75 into aperture 71 of AOM 70 and all the beams are incident in the AOM at their Bragg angle. Typically, telecentric telescope lens functions to size the beams so that they fit into aperture 71 and enter aperture 71 as an array of parallel beams. Optionally variable beam expansion for the cross-scan direction is provided by adjusting distances between beam adjustment lenses 63. According to some embodiments of the present invention, a cylindrical lens 83 bends individual beams diffracted from AOM so that the beams impinge a pupil plane at same spot but from different angles. According to some embodiments of the present invention and as will be described in more detail herein below, the individual beams are diffracted consecutively with the AOM as an acoustic wave propagates in acoustic direction 75 but are exposed on a same spot on an exposure plane by using the Scophony principle.

Figure 3B:
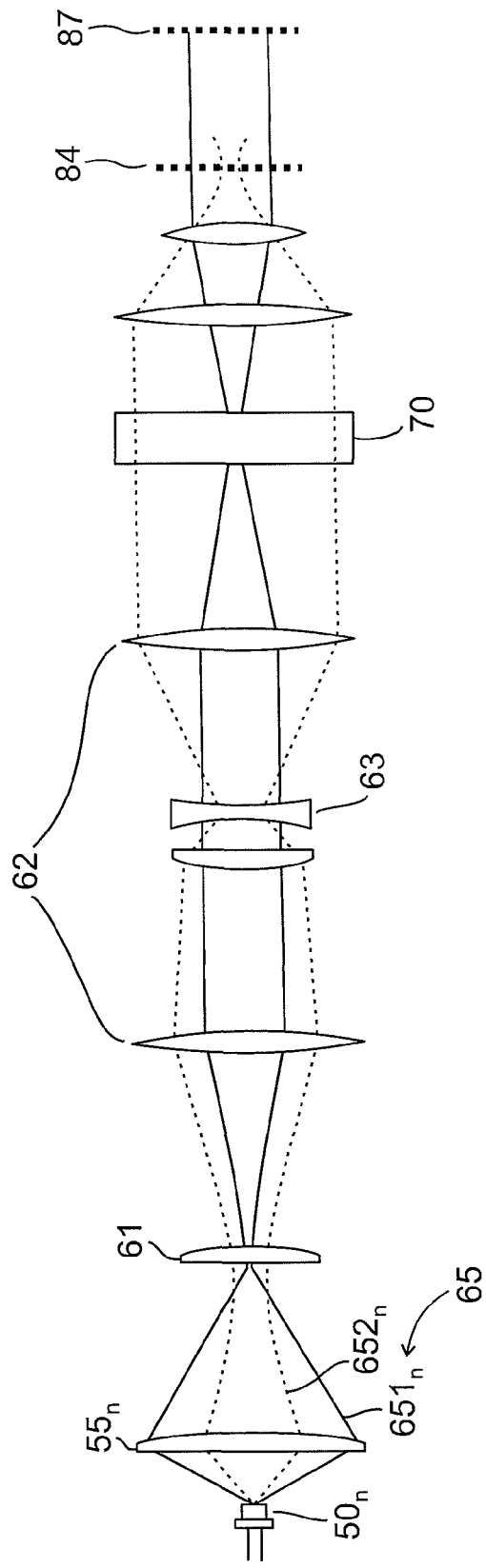
FIG. 3B is a schematic diagram of an exemplary optical design for shaping an individual beam in a scan and cross-scan direction in accordance with some embodiments of the present invention.

Reference is now made to FIG. 3B showing a schematic diagram of an exemplary optical design for shaping an individual beam in the scan direction and cross-scan direction respectively and to FIG. 3C showing a simplified schematic diagram of beams imaged on an AOM and a pupil plane both in accordance with some embodiments of the present invention. As shown, a solid line $651_n$ represent a ray of individual beam $65_n$ in a fast axis aligned with the scan direction 85 and a dashed line $652_n$ represents a ray of beam 65 in a slow axis typically aligned with the cross-scan direction 86. According to some embodiments of the present invention, in an AOM plane and/or object plane 73, e.g. exposure plane, each LD beam, $65_1, 65_2, 65_3, \ldots 65n, \ldots 65_N$ is formed to have a narrow beam waist along scan direction 85 and is formed to be elongated along cross-scan direction 86. Optionally, the beam has a near Gaussian beam profile, e.g. $M^2 \sim 1.5$ along a fast axis and a higher order beam profile, e.g. $M^2 \sim 7$ along slow axis of the beam. In some exemplary embodiments, collimating lens 61 adjusts the beam waist to a desirable width in the scan direction. Typically, the beams in the exposure plane are an image of the beams in the AOM plane while the pupil plane is a conjugated plane to both the AOM plane and exposure plane.

According to some embodiments of the present invention, in a pupil plane 89 (FIG. 3C), all beams $65_1, 65_2, 65_3, \ldots 65_N$ from LDs $50_1, 50_2, 50_3, \ldots 50_N$ impinge at same spot but from different angles. According to some embodiments of the present invention, each of beams $65_1, 65_2, 65_3, \ldots 65_N$ are formed to have a wide beam waist along the scan direction 85 (in scan pupil plane 87) and is formed to have a narrow beam waist along a cross-scan direction 86 (in cross-scan pupil plane 84). Typically, pupil plane 89 (FIG. 3C) is a virtual plane composed from physical scan pupil plane 87 typically coinciding with a facet plane of polygon 80 and cross-scan pupil plane typically positioned between AOM 70 and a facet plane of polygon 80 (FIG. 3B).

Figure 4A:
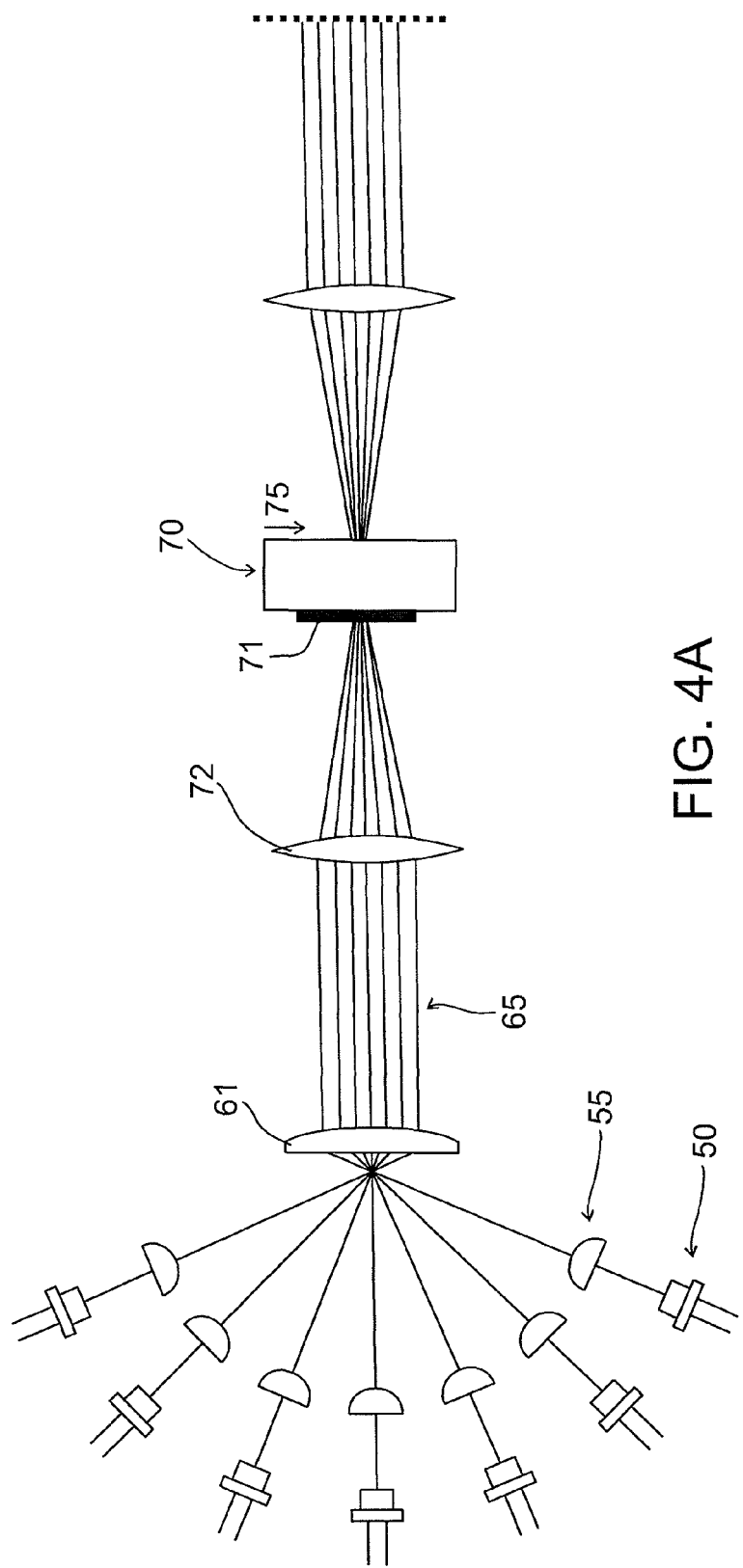
FIG. 4A is a schematic diagram of an alternate exemplary optical design for arranging individual beams of the array inside an aperture of an AOM in accordance with some embodiments of the present invention.

Reference is now to FIG. 4A showing a schematic diagram of an alternate exemplary optical design for arranging individual beams of the array inside an aperture of an AOM in accordance with some embodiments of the present invention. According to some alternate embodiments of the present invention, the beam forming optical system shapes the beams to have a large beam diameter both in the scan and cross-scan direction. Typically, each of beams in beam array 65 is shaped to fill aperture 71. Typically, a cylindrical lens 61 collimates beams from individual LDs in the array 50 along an acoustic direction 75 and a lens system 72 relays the beams into aperture 71 of AOM 70 so that the individual beams overlap in one position in AOM 70. Although, the individual beams overlap, each of the beams impinge the AOM crystal at different angles, e.g. slightly different angles but typically close to the Bragg angle.

According to these alternate embodiments of the present invention, individual beams diffracted from AOM impinge a pupil plane at different spots but from the same angle and impinge exposure plane 95 (FIG. 1) at a same spot but from different angles. In these embodiments, a portion of all the large diameter beams, e.g. the active beams are diffracted simultaneously. As will be described in more detail herein below, subsequent portions of all the large diameter beams are diffracted in a consecutive manner as an acoustic wave propagates in acoustic direction 75 but are exposed on a same spot on an exposure plane by using the Scophony principle.

Figure 4B:
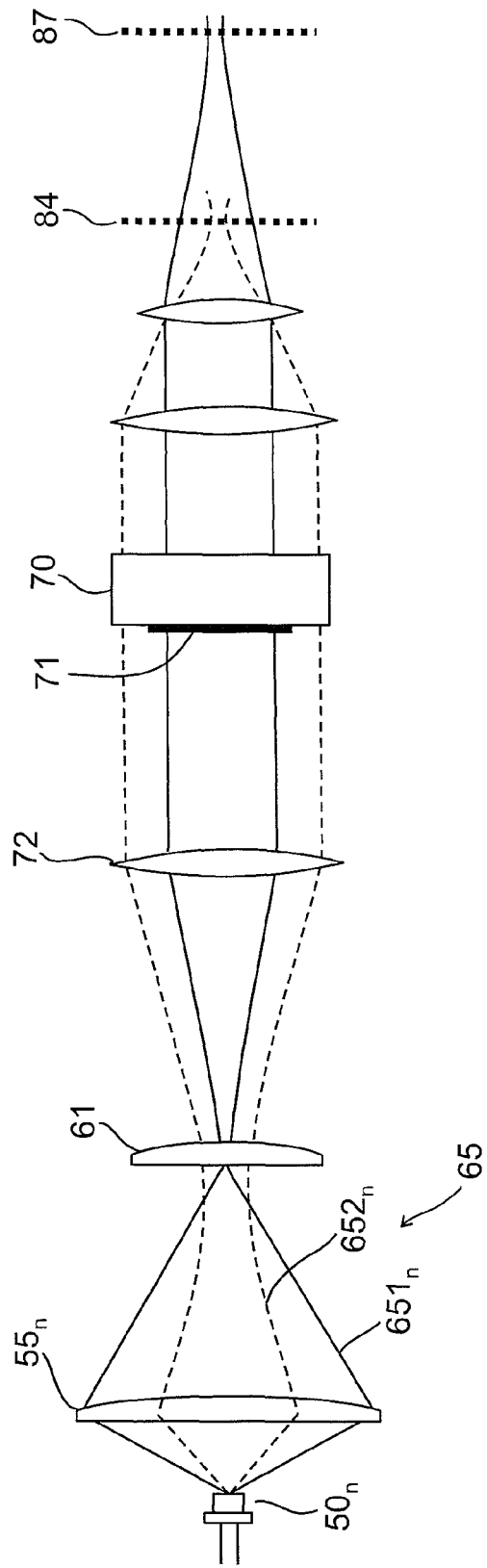
FIG. 4B is a schematic diagram of an alternate exemplary optical design for shaping an individual beam in a scan and cross-scan direction in accordance with some embodiments of the present invention.

Reference is now made to FIG. 4B showing a schematic diagram of an alternate exemplary optical design for shaping an individual beam in the scan direction and cross-scan direction respectively and to FIG. 4C showing a simplified schematic diagram of beams imaged on an AOM and a pupil plane in an alternate exemplary optical design both in accordance with some embodiments of the present invention. As shown, a solid line $651_n$ represent a ray of individual beam $65_n$ in a fast axis aligned with scan direction 85 and dashed line $652_n$ represents a ray of beam $65_n$ in a slow axis typically aligned with the cross-scan direction 86. According to some embodiments of the present invention, in AOM and/or object plane 73, each LD beam, $65_1, 65_2, 65_3, \ldots 65_n, \ldots 65_N$ is formed to have a large beam waist both in scan direction 85 and cross-scan direction 86 that fill aperture 71 in both the scan and cross-scan direction. Optionally, the beam has a near Gaussian beam profile, e.g. $M^2 \sim 1.5$ along a fast axis and a higher order beam profile, e.g. $M^2 \sim 7$ along slow axis of the beam. In some exemplary embodiments, collimating lens 61 adjusts the beam waist to a desirable width in the scan direction. Optionally variable beam expansion is provided in cross-scan direction by adjusting distances between beam adjustment lenses (not shown for simplicity).

According to some embodiments of the present invention, in a pupil plane 89, all beams $65_1, 65_2, 65_3, \ldots 65_N$ from LDs $50_1, 50_2, 50_3, \ldots 50_N$ impinge at different spots but from a same angle. According to some embodiments of the present invention, each of beams $65_1, 65_2, 65_3, \ldots 65_N$ are formed to have a narrow beam waist along both scan direction 85 (in scan pupil plane 87) and cross-scan direction 86 (in cross-scan pupil plane 84). Typically, pupil plane 89 (FIG. 4C) is a virtual plane composed from physical scan pupil plane 87 typically coinciding with a facet plane of polygon 80 and cross-scan pupil plane typically positioned between AOM 70 and a facet plane of polygon 80 (FIG. 4B).

Figure 5:
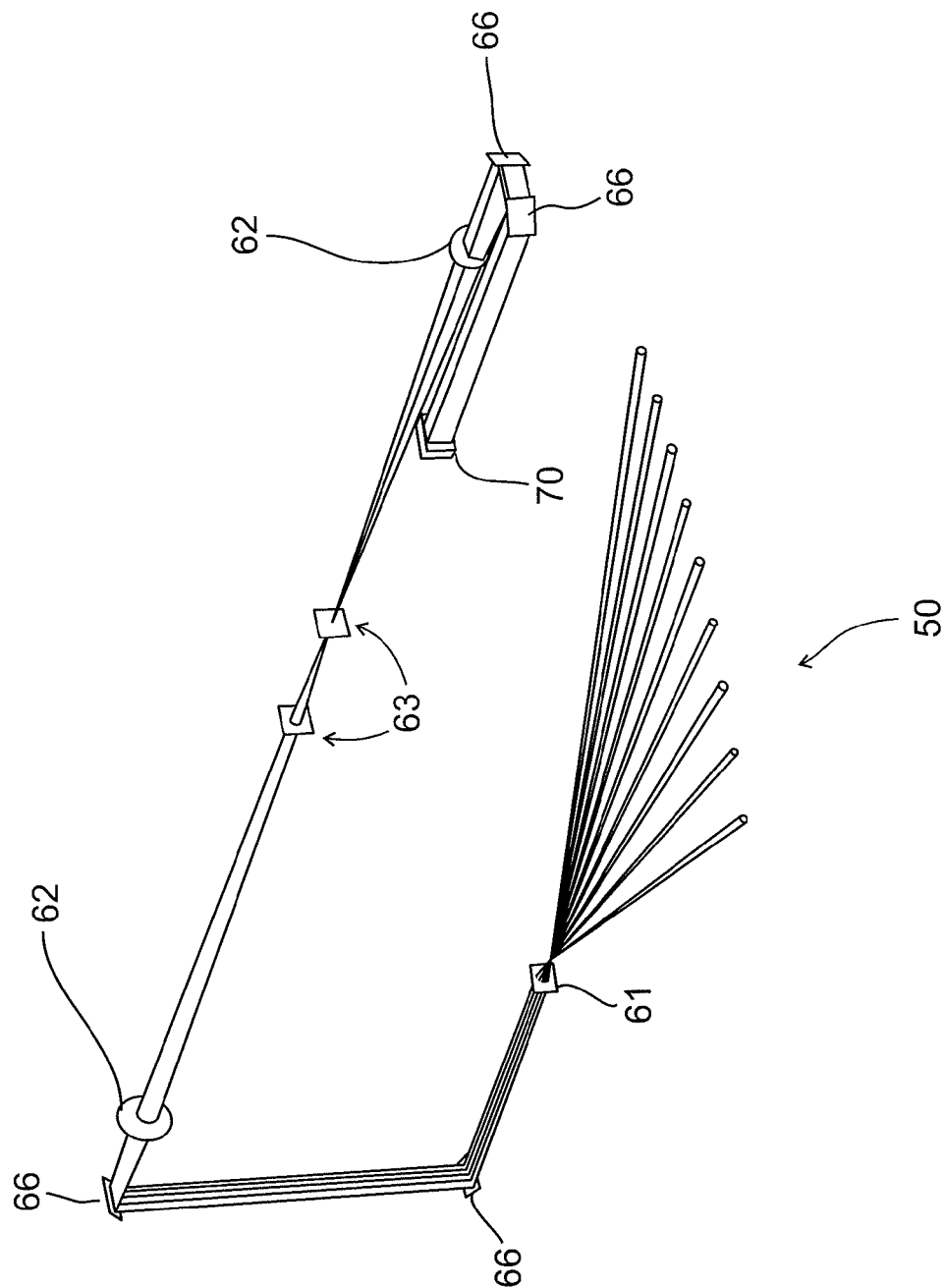
FIG. 5 is an exemplary optical path of a beam forming optical system in a DI system in accordance with some embodiments of the present invention.

Reference is now made to FIG. 5 showing an exemplary optical path of a beam forming optical system in the DI system in accordance with some embodiments of the present invention. According to some embodiments of the present invention, illumination from a dense array of LDs 50 is collimated with a collimating lens 61 and directed via a plurality of reflecting surfaces 66 toward AOM 70 for beam modulation. Typically each of the LDs in the array is associated with a dedicated lens, e.g. from lens array 55 for focusing the beams onto collimating lens 61. Optionally, LDs in the array include LDs of different wavelengths and/or polarizations. In some exemplary embodiments, only a portion of the LDs in array 50 are operated during scanning. In some exemplary embodiments, each of the beams from the array is shaped in the cross-scan direction with lens 63 and is relayed onto the AOM with a pair of telescope lenses 62. Optionally, beam expansion in the cross-scan direction is adjustable by adjusting distance between lenses 63.

Reference is now FIG. 6 showing a schematic diagram of an exemplary array of light beams arranged in a multi-channel AOM in accordance with some embodiments of the present invention. According to some embodiments of the present invention, an array of illumination beams 65 that are collimated are arranged along scan direction 85 and/or acoustic direction 75 enter an aperture 71 of AOM 70. Optionally, 2-100 illumination beams are arranged along acoustic direction 75. Typically, each beam 65 is shaped to be elongated along a direction perpendicular to acoustic direction. Typically each beam is modulated over a plurality of acoustic channels with electrode array 79. Typically, electrode array 79 is arranged along an axis perpendicular to acoustic direction 75 optionally aligned with cross-scan direction 86. Typically, the multiple channels provide for writing more than one pixel at a time.

During operation, RF signals are transmitted to electrodes 79 based on a modulation pattern initiating acoustic sound waves to propagate in acoustic direction 75 from a position of electrodes 79. According to some embodiments of the present invention, when an acoustic wave propagates along an acoustic channel, the wave consecutively diffracts the portion of each of beams of array 65 associated with the triggered acoustic channel. According to some embodiments of the present invention, since all beams in a same channel are modulated by a same signal, all the beams in the channel are modulated in a same manner. In some exemplary embodiments, an acoustic wave packet modulates a plurality of beams from array 65 at a time.

Reference is now made to FIG. 7 showing an exemplary schematic illustration of an image of an AOM window over three different time frames of acoustic wave packet propagation in accordance with some embodiments of the present invention (denoted by $t_1$, $t_2$, $t_3$). Typically, an image 88 of AOM 70 is moved across exposure plane 95 with a velocity, vscan in scan direction 85 with rotating polygon 80 (FIG. 1). Although, the entire image is moved in scan direction 85, only a portion 110 of image 88 that coincides with a position of the acoustic wave packet is diffracted toward exposure panel 95. That portion 110 of image 88 that coincides with a position of the acoustic wave packet moves in acoustic direction 75 (opposite scan direction 85) at a velocity determined by the velocity of the acoustic wave packet and the magnification of scanning optical system 90.

According to some embodiments of the present invention, the scanning velocity, vscan, is adjusted to be equal in magnitude but opposite in direction to acoustic velocity, vacoust (vscan=−vacoust), so that an advancing acoustic wave packet in moving AOM window 88 always diffracts a portion 110 of image 88 toward a same spot 951 on exposure panel 95. Therefore, spot 951 is stationary in an exposure plane of the recording medium and can be consecutively illuminated by all individual laser diode beams. In this manner the beams are combined incoherently. Optionally scan lines are overlapped in the cross-scan direction for smooth energy profile.

Figure 8:
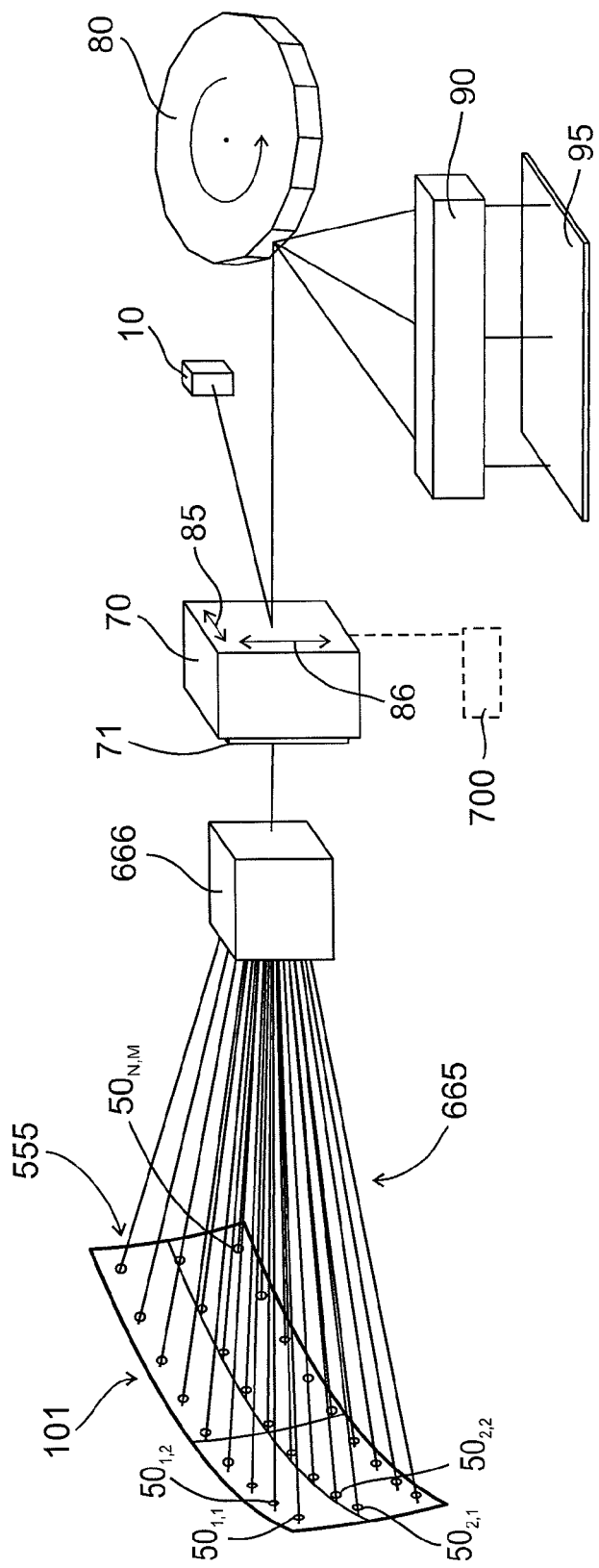
FIG. 8 is a simplified schematic drawing of an exemplary matrix of light sources formed into a writing beam in accordance with some embodiments of the present invention.

Reference is now made to FIG. 8 showing simplified schematic drawing of an exemplary matrix of light sources formed into a writing beam in accordance with some embodiments of the present invention. According to some embodiments of the present invention, an illumination unit 101 includes a matrix 555 of light sources $50_{11}, 50_{12}, \ldots 50_{21}, 50_{22}, \ldots 50_{NM}$ and/or more than one array of light sources providing a plurality of beams 665 that are shaped with dedicated lens, e.g. similar to lenses 55 (FIG. 1) and beam forming optical system 666 to fit into an aperture 71 of an AOM 70. According to some embodiments of the present invention, the matrix 555 is arrange on a concave shaped plane so that illumination from a large number of light sources can be directed toward beam forming optical system 666. In some exemplary embodiments, each LD in matrix 555 is associated with a dedicated lens (not shown for simplicity sake) that focuses and aligns beams 665 from LDs 555 onto beam forming optical system 666. According to some embodiments of the present invention matrix 555 includes 1-20 arrays of 2-100 light sources.

According to some embodiments of the present invention, the number of beams 665 that can be coupled into the system is limited by an angular acceptance range of scan optics 90 and a size of aperture 71. Typically, the angular acceptance range is different for scan direction 85 and cross-scan direction 86 and is determined by a numerical aperture of scan optics 90 in image plane 95 and the magnification of the system between AOM 70 and image plane 95. According to some embodiments of the present invention, for a given angular acceptance range, a size of a beam in aperture 71 of AOM 70 from a single LD can be calculated, e.g. a smallest achievable beam size can be calculated. Typically, the smallest achievable beam depends on the beam parameter product ($M^2$) of the LD which is a measure an angular divergence of the beam for a given spot size. According to some embodiments of the present invention, once a size of a single beam in aperture 71 is calculated, the size of aperture 71 defines a number of LD beams that fit into aperture 71 each of which has an angular divergence that fits into the angular acceptance range of scan optics 90. Typically, the number of rows versus columns in matrix 555 depends both on dimensions of aperture 71. Typically, AOM 70 modulates incoming beams 665 based on image data received from a data control unit 700 and a scanning optical system 90 images the plane of the AOM including the modulated data onto exposure plane 95 as beams are deflected from rotating polygon 80.

Reference is now made to FIGS. 9A, 9B, 9C and 9D showing exemplary schematic diagrams of beams arranged in a plurality of arrays as imaged on AOM planes and corresponding pupil planes in accordance with some embodiments of the present invention. For exemplary purposes, beam forming of beams from a matrix 555 including only 5 LDs along cross-scan direction 86 and 12 LDs along scan direction 85 is shown. Typically, the aperture in pupil plane is an angular aperture. Typically, a matrix 555 of an illumination unit 101 includes 50×10 LDs that are formed with optical system 666 to fit into aperture 71. According to some embodiments of the present invention, beams in matrix 555 can be formed in a plurality of different configurations to form a writing beam.

Referring now to FIG. 9A, in some exemplary embodiments, beams 665 are formed to be narrow both in a cross-scan and scan direction and are arranged in a staggered matrix formation in AOM plane to form image 701. In some exemplary embodiments, in image 701, each of beams 665 impinge AOM plane 733 from a same angle but in a different position. In these embodiments, each beam in corresponding pupil plane 899 impinges at a same position and fills an entire aperture.

Referring now to FIG. 9B, in some exemplary embodiments, beams 665 are formed to be wide in cross-scan direction 86 and narrow in scan direction 85 and are arranged in a staggered column array in AOM plane to form image 702. According to some embodiments of the present invention, beams 665 from each of the different rows in each column, e.g. the five rows are formed to impinge AOM plane 733 at a same position but from different angles while beams 665 from each of the different columns are formed to impinge AOM plane 733 at a different position but at a same angle. In these embodiments, the resulting image 702 in AOM plane 733 is typically a single array including a number of wide spots corresponding to the number of columns, e.g. 12 columns that are staggered along scan direction 85. According to some embodiments of the present invention, in corresponding pupil plane 899, the resultant image 802 is an image 802 including a single array of wide spots staggered along cross-direction corresponding to the number of rows, e.g. 5 rows. Typically in these embodiments, in the pupil plane 899, beams 655 from the different columns but from a same row impinge in a same spot.

Referring now to FIG. 9C, in some exemplary embodiments, beams 665 are formed to be wide in scan direction 85 and narrow in cross-scan direction 86 to form image 703. In these embodiments, beams 665 from each of the different columns in each row, e.g. 12 columns are formed to impinge AOM plane 733 at a same position but from different angles while beams 665 from each of the different rows are formed to impinge AOM plane 733 at a different position but at a same angle. Typically, the resulting image 703 in AOM plane 733 is a single array including a number of wide spots corresponding to the number of rows, e.g. 5 rows that are staggered along cross-scan direction 86. In these embodiments, in corresponding pupil plane 899, beams 655 form image 803 of a single array including a number of wide spots corresponding to the number of columns, e.g. 12 columns that are staggered along scan direction 85. In image 803 of pupil plane 899, beams 655 from different rows but from a same column typically impinge in a same spot.

Referring now to FIG. 9D, in some exemplary embodiments, beams 665 are formed with optical system 666 to impinge at a same position and fill aperture 71 in both scan direction 85 and cross-scan direction 86, each from a different angle to form image 704. According to some embodiments of the present invention, in corresponding pupil plane 899, each of beams 665 impinge at a different position and from a matrix formation in both a scan and cross-scan direction (is formed) in image 804. In these embodiments, each of beams 665 in pupil plane 899 is typically narrow in both scan direction 85 and cross-scan direction 86.

According to some embodiments of the present invention, beams 665 are formed so that an average cross-scan beam profile in aperture 71 is smooth since consecutive scan lines are overlapped in the cross-scan direction. Typically, image 702 provides a smoother profile in cross-scan direction as compared to image 703. Optionally, the staggered matrix formation of beams 655 in image 701 provides overlapping in cross-scan direction 86 which can improve the smoothness of the profile.

Reference is now made to FIGS. 10A-10D showing simplified schematic drawings that illustrate a facet tracking method in accordance with some embodiments of the present invention. According to some embodiments of the present invention, facet tracking is achieved by sequentially turning ON and OFF different LDs in array 50 in coordination with rotation of polygon 80 and/or angle of facet of polygon 80, used for scanning, e.g. facet 81.

According to some embodiments of the present invention, light sources 50 are arranged and/or their respective beams are formed such that each light source from array 50 projects a beam that impinges facet 81 at a different position along a length L of facet 81. Optionally, distribution of the impinging beams along the length of facet 81 is achieved by adjusting each light source of array to have a different angle of incidence in AOM 70. Optionally, the desired distribution along the length of facet 81 is achieved with a cylindrical lens 83. In some exemplary embodiments, beams from light sources in array 50 are arranged and/or formed to project light along a length greater than length L of a single facet.

According to some embodiments of the present invention, as polygon 80 rotates, a different set of light sources provides beams that impinge on facet 81, while the other light sources that emit beams that impinge near or past an edge of facet 81 are turned off and/or not used to writing. Typically, for each spot or pixel written, a different set of light sources is used. Alternately, the set of light sources used is altered for every other spot or pixel written and/or after a plurality of spots are written.

Figure 10A:
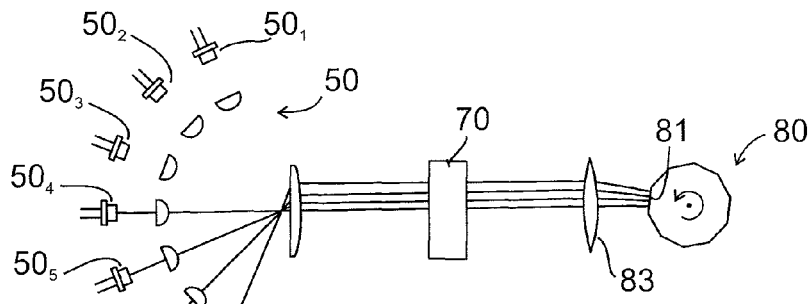
FIGS. 10A, 10B, 10C and 10D are simplified schematic drawings illustrating a facet tracking method in accordance with some embodiments of the present invention.
Figure 10B:
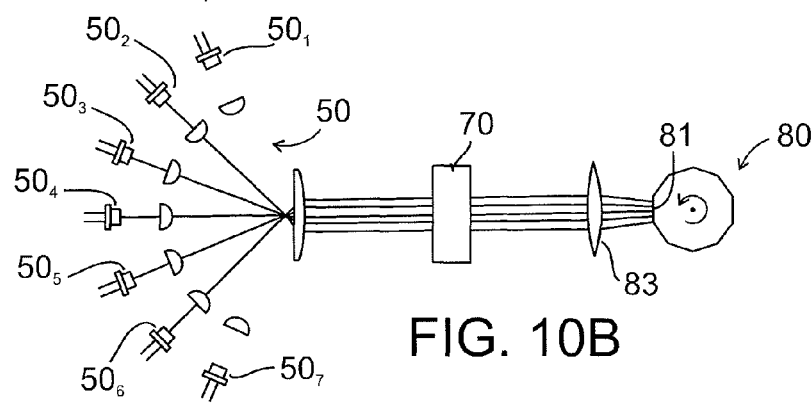
Figure 10C:
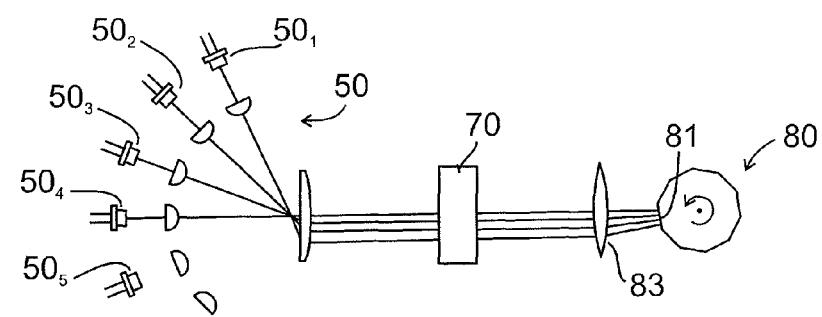
Figure 10D:
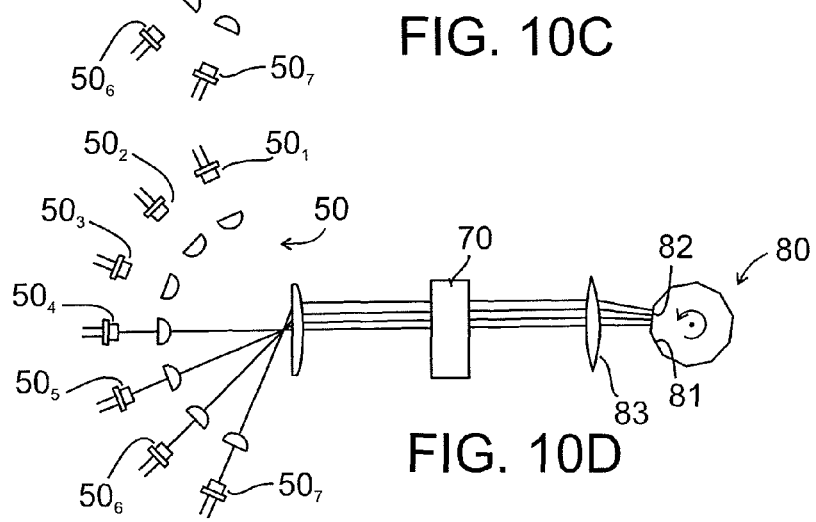

By way of example, in FIG. 10A shows a first stage where LDs $50_4$, $50_5$, $50_6$ and $50_7$ are operated at a beginning of a scan line, while LDs $50_1$, $50_2$, and $50_3$ that project light near or past an edge of facet 81 are not used. Optionally, the system is configured for operating half the light sources for writing each spot and/or pixel on the exposure panel. Referring now to FIG. 10B, as polygon 80 rotates, LDs $50_2$, $50_3$, $50_4$, $50_5$ and $50_6$ are operated and LD $50_1$ and $50_7$ are turned off so that only beams that are directed toward facet 81 are operated. Referring to FIG. 10C, as polygon 80 further rotates, LDs $50_1$, $50_2$, $50_3$, and $50_4$ are operated and LD $50_5$, $50_6$ and $50_7$ are turned off. In FIG. 10D, an additionally scan line is started with facet 82 by shifting back to operating first portion of the light sources, LDs $50_4$, $50_5$, $50_6$ and $50_7$ In this manner facet tracking may be achieved while AOM 70 is operated at a single RF frequency. Typically, when only a portion of the light sources are operated at any one time, the achievable output power is compromised. Optionally, a larger array and/or more than one array may be used to scale up the output power.

Figure 11:
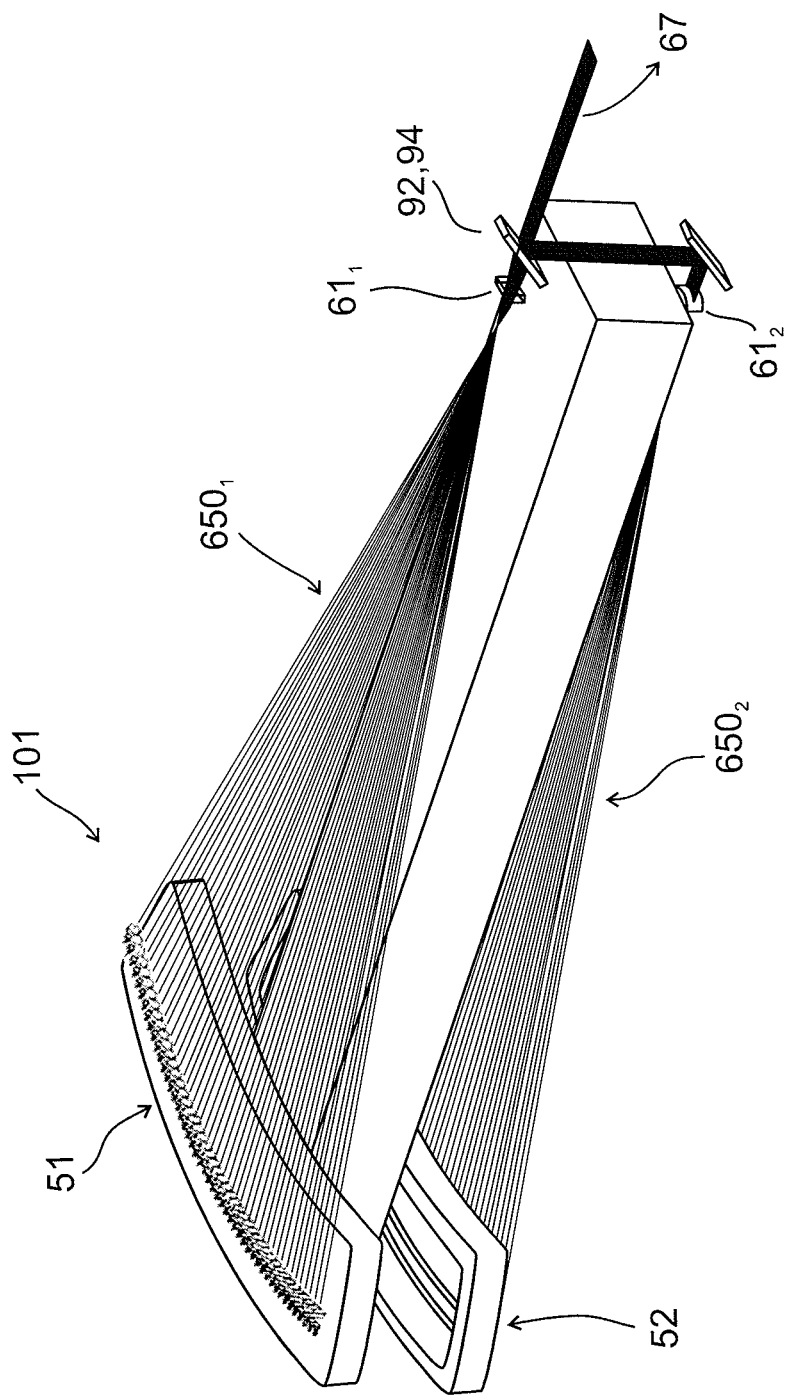
FIG. 11 is a simplified schematic drawing of a exemplary illumination unit including two arrays of light sources and optics for combining beams from the two arrays in accordance with some embodiments of the present invention.

Reference is now made to FIG. 11 showing a simplified schematic drawing of an exemplary illumination unit including two dense arrays of light sources and optics for combining beams from the two arrays in accordance with some embodiments of the present invention. Typically, the number of individual beams that can fit through an aperture of an AOM is limited. According to some embodiments of the present invention, output power can be further increased by combining beams from two or more light sources into a single beam. According to some embodiments of the present invention, improved scalability of the illumination is achieved by using an illumination unit 101 that includes more than one array, e.g. array 51 and array 52 and combining beams from the different arrays. Typically, array 51 has a different corresponding wavelength and/or polarization than array 52 so that the beams from each array can be combined with low and/or no loss of power. According to some embodiments of the present invention, beam array $650_1$ and $650_2$ are combined into one beam array 67 using a polarization splitter 94 and/or a wavelength selective element 92. Optionally, each of arrays 51 and 52 can be replaced with a matrix of LDs that are combined to form a single scaled matrix of beams.

Figure 12:
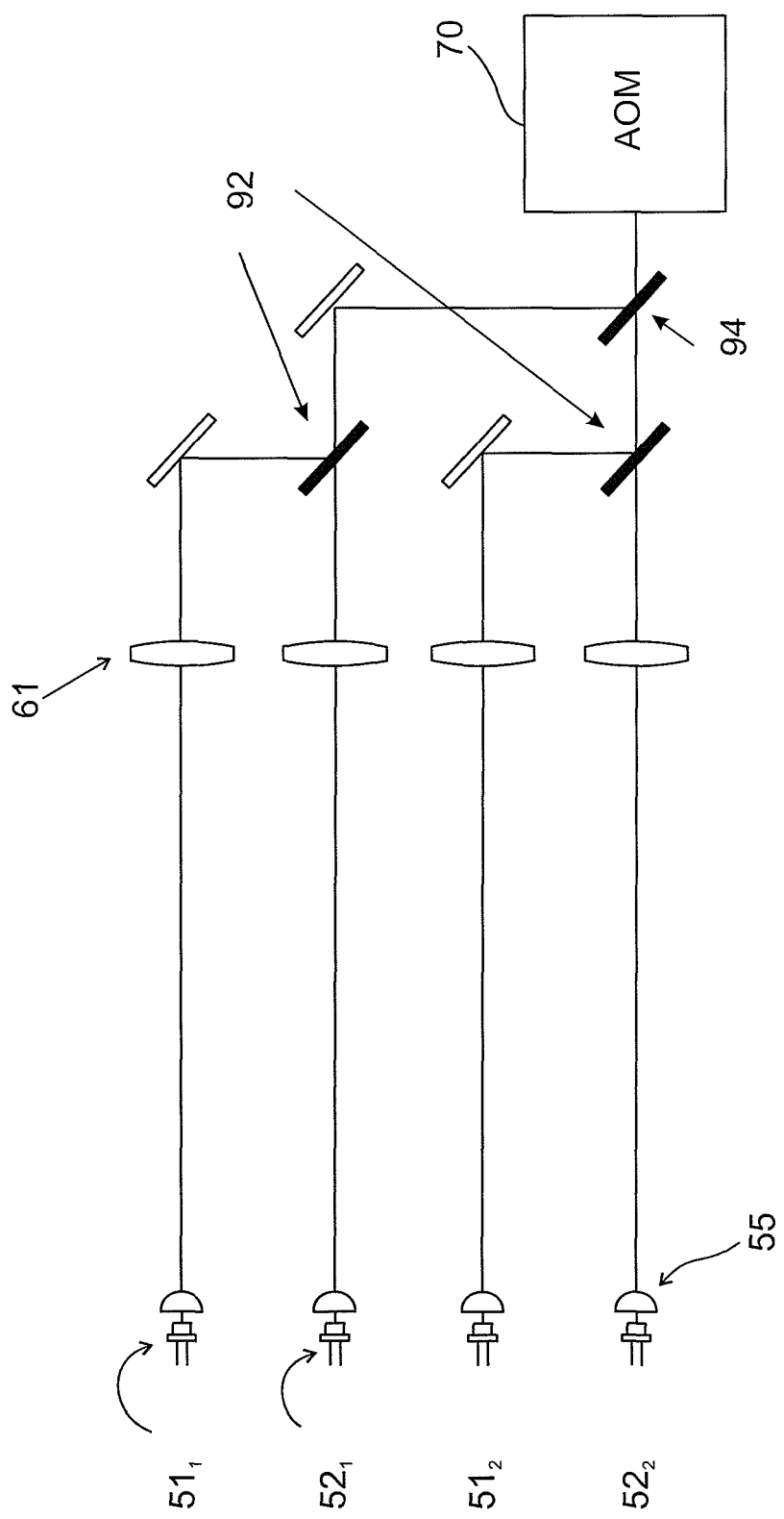
FIG. 12 is a schematic diagram of an exemplary optical design for combining beam from different arrays in accordance with some embodiments of the present invention.

Reference is now made to FIG. 12 showing a schematic diagram of an exemplary optical design for combining beams from different arrays in accordance with some embodiments of the present invention. According to some embodiments of the present invention, LDs from four different arrays are combined into a single array. According to some embodiments of the present invention, a wavelength selective element 92 combines beams of different wavelengths and a polarization splitter 94 combines beams of different polarization. For example an LD $51_1$ and $51_2$ from two different arrays have a same wavelength but different polarization and a LD $51_1$ and $52_1$ are different in wavelength but have a same polarization. Similarly LD $51_2$ and $52_2$ are different in wavelength but have a same polarization. Optionally, beams from $51_1$, $51_2$, $52_1$ and $52_2$ can all be combined since each differs in at least one of wavelength and polarization.

Figure 13:
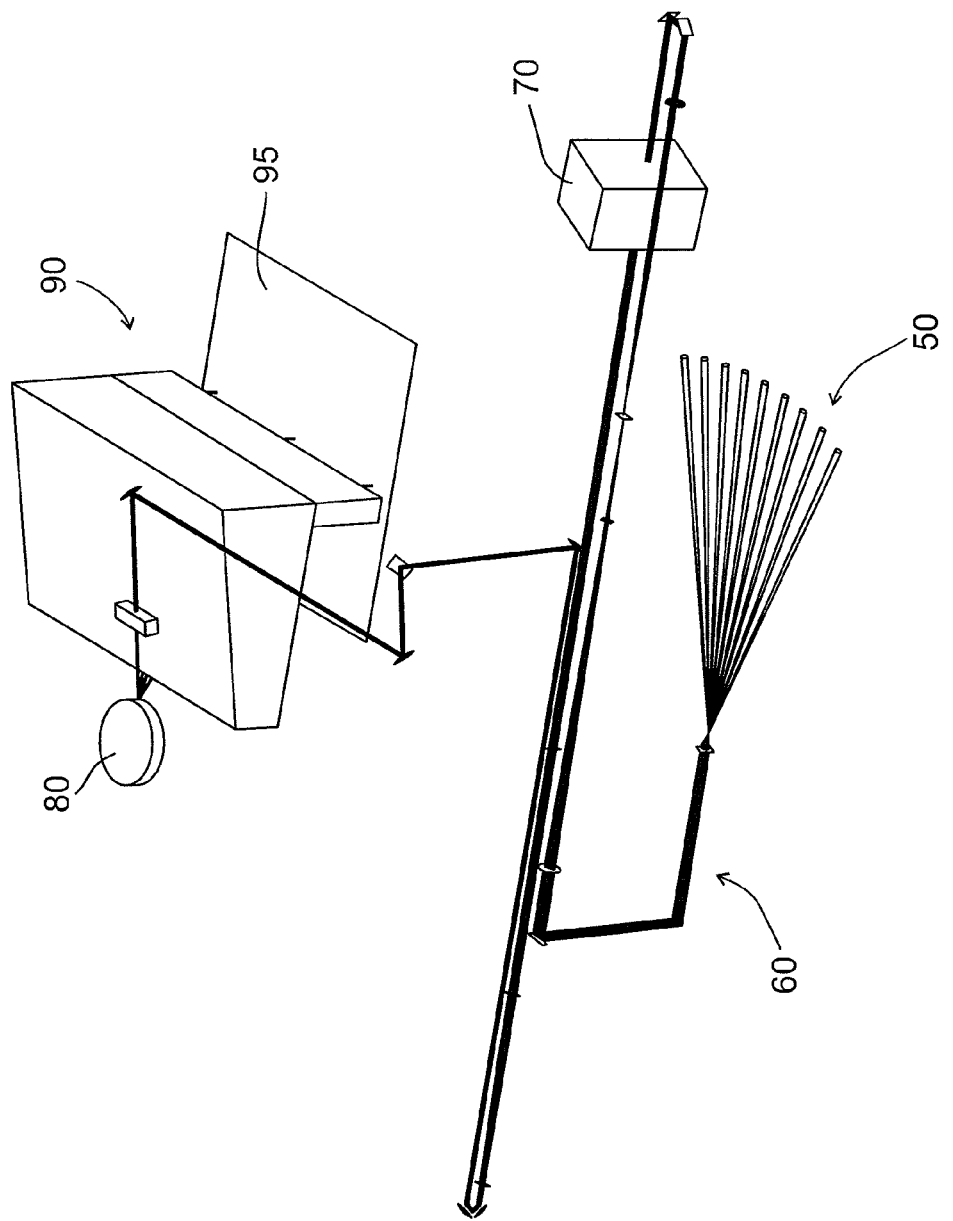
FIG. 13 is an exemplary DI system in accordance with some embodiments of the present invention.

Reference is now made to FIG. 13 showing an exemplary DI system in accordance with some embodiments of the present invention. According to some embodiments of the present invention, in a DI system 100, illumination from array 50 of LDs is collimated with a collimating optical lens 61 and directed toward AOM 70 for modulation. The modulated beam provided by AOM 70 is directed toward rotating polygon 80 for scanning onto a recording medium 95 as the recording medium is scanned in a scan direction 85. Typically, illumination diverted by rotating polygon 80 is magnified with scanning optics 90 prior to exposing recording medium 95. According to some embodiments of the present invention, the scanning rate is adjusted to equal the acoustic velocity rate of AOM 70 multiplied by the magnification provided scanning optics 90 to provide for repeatedly exposing spots and/or pixels with a plurality of the LDs in array 50 using the Scophony scanning effect. In some exemplary embodiments, the polygon is rotated at a rate of 3000 RPM.

The terms "comprises", "comprising", "includes", "including", "having" and their conjugates mean "including but not limited to".

The term "consisting of" means "including and limited to."

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A beam-forming optical system comprising:
a plurality of light sources configured to output a plurality of beams, the plurality of light sources comprising at least a first light source configured to output a first beam and a second light source configured to output a second beam, wherein a wavelength of the first beam is the same as a wavelength of the second beam;
a first lens, positioned to receive all of the plurality of beams incident on the first lens at different angles, and configured to collimate the plurality of beams;
a telecentric telescope lens system, positioned to receive all of the plurality of beams transmitted by the first lens; and
an acoustic optical modulator (AOM) positioned to receive all of the plurality of beams transmitted by the telecentric telescope system and comprising an aperture for receiving the plurality of beams;
wherein the telecentric telescope lens system modifies a beam cross-section of each of the plurality of beams in at least one of a first direction, parallel to an acoustic direction of the AOM, and a second direction, perpendicular to the first direction.

2. The beam-forming optical system according to claim 1, wherein the telecentric telescope lens system extends a cross section of each of the plurality of beams in the second direction and aligns the plurality of beams along the second direction, such that the plurality beams are incident on the aperture of the AOM as an array of parallel beams.

3. The beam-forming optical system according to claim 1, wherein the telecentric telescope lens system extends a cross-section of each of the plurality of beams in both the first direction and in the second direction and diffracts the plurality of beams such that each of the plurality of beams overlap each other in a plane of the aperture of the AOM.

* * * * *